Sept. 22, 1964 L. N. MORTENSON ETAL 3,149,493

FLUID SAMPLING DEVICE

Filed Oct. 16, 1961

INVENTORS.
LEE N. MORTENSON
RONALD K. PEARSON
BY

ATTORNEY.

3,149,493
FLUID SAMPLING DEVICE
Lee N. Mortenson, Manhattan Beach, and Ronald K. Pearson, Paramount, Calif., assignors to Wyle Laboratories, a corporation of California
Filed Oct. 16, 1961, Ser. No. 145,231
1 Claim. (Cl. 73—422)

This invention relates to the art of flow sampling for purposes of obtaining a sample of a flowing fluid in order to test the sample to determine the fluid properties, condition or composition thereof. The invention may find application in any of various fields and particularly, for example, it may be utilized in the sampling and testing of liquids and gases.

In sampling a flowing fluid, as described and testing a sample, it is an objective, of course, to be assured that the sample is truly representative of the flowing stream, otherwise the results of the tests would not be true, and reliably indicative of the fluid properties condition or composition of the fluid being tested. Reliability of the test of the fluid, of course, may be extremely important and significant as, for example, in the testing of liquids and gases where the reliability of performance of military equipment such as aircraft, rockets, etc., may be dependent upon the quality and purity of the propellant.

It is an objective of the herein invention to meet the foregoing requirements and provide a solution to the problems stated.

The invention herein provides a sampling device or unit, sometimes referred to as a wedge-type sampling device. The device is one which presents a uniform narrow slot-like opening transversely to and entirely across the flowing stream of fluid. In conjunction with this particular opening, there is established and utilized isokinetic flow of the fluid internally of, and externally of the opening as described more in detail hereinafter, whereby the object and result is realized of the sample being truly and dependably representative of the entire cross-section of the flowing stream. This is achieved since by reason of the isokinetic flow, the flow patterns at the point of admission of fluid to the slot-like opening are undisturbed so that the sample itself is a true and reliable indication of the quality of the flowing fluid over the entire cross-section of the flow thereof.

A further object of the invention, in addition to the foregoing, is to provide improved means, including automatic means for maintaining the isokinetic flow with respect to the sampling unit.

Another object is to provide pressure responsive control means for controlling flow of fluid through the sampling unit to maintain the conditions of isokinetic flow.

Other objects and advantages of the invention reside in specific and structural arrangements and features which will become more apparent from the following detailed description thereof, claim, and annexed drawings wherein:

Figure 1:
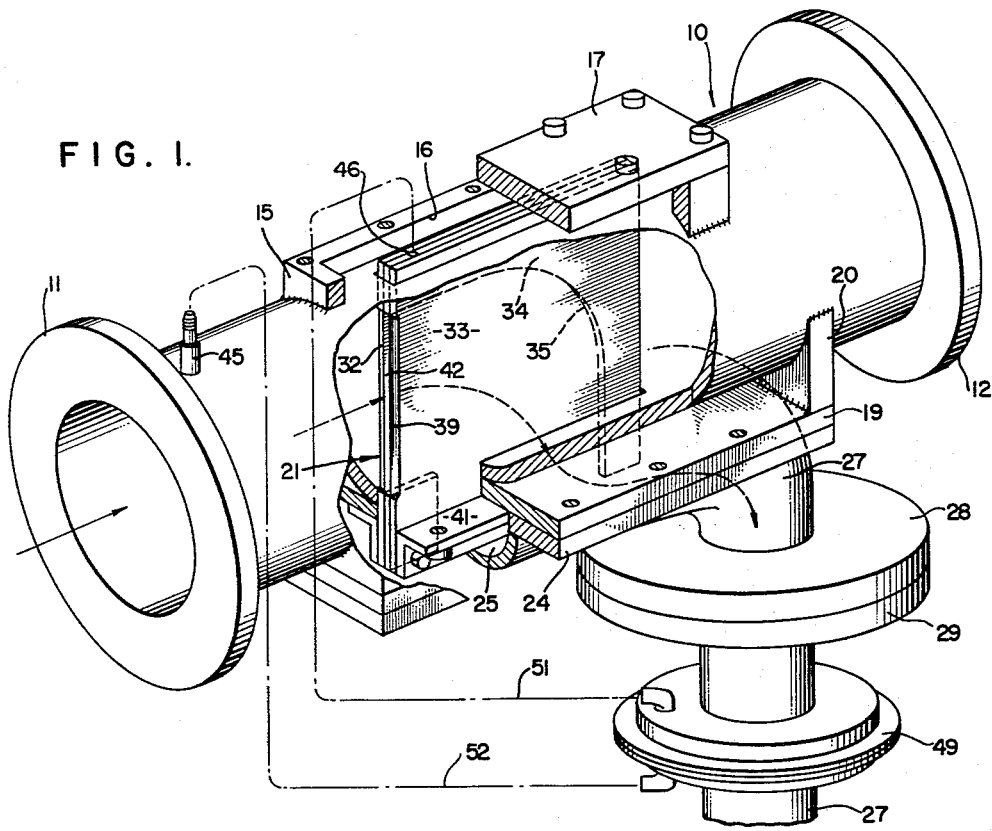
FIGURE 1 is a perspective view partly broken away in somewhat diagrammatic form of a preferred form of the invention.

Referring now in more detail to the drawings, FIGURE 1 shows a type of unit which may have the flow sampling device of the invention embodied therein. Numeral 10 is a section of conduit having flowing through it the fluid which is to be sampled. At the ends of the section of conduit are flanges 11 and 12 for coupling to other sections of conduit. A housing and support construction is built into or onto the conduit section 10 to receive and support the sampling unit or device itself. Numeral 15 designates a rectangular frame as shown which is welded to the top of the section 10 over an opening in the conduit aligned with the opening 16 in the interior of the frame. The frame 10 is covered and closed by a plate 17 which is attached by bolts or screws, preferably with a sealing gasket between the parts.

At the bottom of the section 10 is another plate 19 attached by welding and also by support members, as shown at 20, welded to the plate 19 and to the side of the conduit 10. The plate 19 has a central slot-like opening for supporting the sampling unit 21 within the conduit 10. The plate 19 may be attached by bolts or otherwise to a plate or flange 24 extending from an open side of a conduit portion 25 which receives the flow sample. This conduit section has an elbow 27 in it connected to a flange 28 attached to another flange member 29. These members may have between them a membrane filter which is part of the testing equipment which will be referred to again presently.

Figure 2:
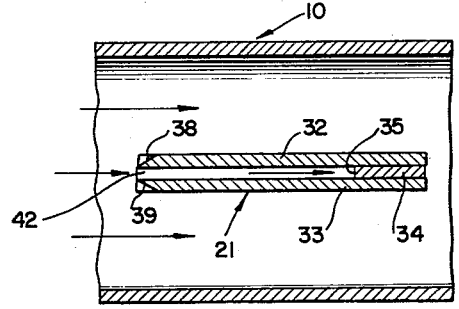
FIGURE 2 is a sectional view of the sampling unit.

In a preferred form of the invention the sampling unit or device is in the form of two flat plates or members 32 and 33 which are spaced from each other by a third member 34 to form a laminated construction. The plate 34 is cut out to have a rounded edge configuration to present the arcuate edge 35 between the other two plates. The upper edges of the assembly 21 are supported within the upper frame 15 as shown in FIGURE 1, and extending through a slot in conduit 10, as shown. The front edges of the plates 32 and 33 are beveled as shown at 38 and 39, as may be seen more clearly in FIGURE 2, so as to present rather sharp forward edges which divide the flow as between that part that goes into the sampling unit and the part that is externally of it. The lower part of assembly 21 is held at the bottom by angle bars, as shown at 41, attached to the plate 19 in conduit section 25.

The sampling unit, as may be seen, presents a relatively narrow slot-like opening 42 which is disposed transversely to and directly and entirely across the flowing stream of fluid in the conduit 10. The sample of fluid enters the space between plates 32 and 33, and by way of the arcuate edge 35 it is uniformly turned and guided downwardly to the bottom of the sampling unit providing communication to the conduit section 25 and then to the testing equipment.

The system provides for isokinetic fluid flow internally and externally of the sampling unit or device, that is the velocity of flow is maintained the same within and without the sampling unit so that there is no disturbance of the flow patterns in the area ahead of and adjacent the slot 42. The result is that the sample taken is truly and reliably representative of the entire cross-section of the flowing stream and the test results can be dependably relied on as being indicative of the fluid properties, composition or condition of all of the fluid going through the unit.

The isokinetic flow may be maintained in different ways. Numeral 45 is a static pressure tap for taking off the pressure in the conduit 10 externally of the sampling unit. Another tap is provided for at 46 for taking off static pressure within the sampling unit. This pressure may be taken off at any of various different points. These pressure taps may be connected to visual indicating manometers to indicate the differential in the pressures within and without the sampling unit. These static pressures are, of course, indicative of the velocity of flow and when they are alike the velocities are the same. The manometers may be observed visually and the flow through the sampling unit manually controlled to establish and maintain the isokinetic flow.

The isokinetic flow may be maintained automatically as shown in FIGURE 1. This is accomplished by a differential pressure responsive control valve 49 in the line or conduit 27. This control valve may be of a known type having differential pressure responsive means, including a means responsive to pressure from the tap 46 through a line 51 and a means responsive to pressure from the tap 45 through a line 52. This pressure responsive valve regulates the flow through the sampling unit to maintain isokinetic conditions of flow.

The equipment as so far described is illustrative of a preferred form and arrangement of the invention. In the arrangement shown, the membrane filter between the flanges 28 and 29 is a part of the apparatus for actually testing the sample of fluid. This type of testing system is one in which the membrane filter is inspected for particulate matter before and after a predetermined period of operation;

The equipment may be arranged otherwise than as shown; for example, the conduit 27 may simply be connected to a throttling orifice and then to a collector vessel or bottle and this may be through a flow restrictor or orifice of predetermined size which determines the rate of flow into the collector over a determined period of time. The fluid sample contained within the vessel or bottle may then be filtered and inspected for contamination.

Figure 3:
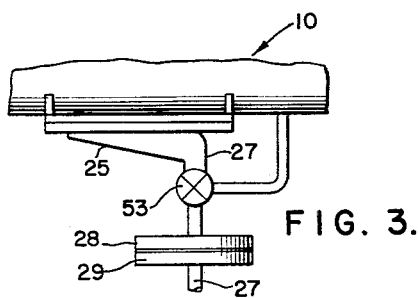
FIGURE 3 is a view of a slight modification of the invention.

Tests may be conducted intermittently either with the type of equipment described or other types of equipment. If desired, a three-way valve may be provided at the elbow in the conduit 27 having positions in which the sample of flow may be either direct to the testing equipment or bypassed directly back to the conduit 10. Thus, with this three-way valve arrangement, when not testing, the part of the flow which is diverted is merely returned to the main flow. Such an arrangement is shown diagrammatically in FIGURE 3, the three-way valve being shown at 53.

From the foregoing those skilled in the art will observe and appreciate that the invention achieves and realizes all of the objectives stated in the foregoing and has the advantages which have been set forth. The sampling unit takes a sharply defined sample of the flowing stream which enters through the slot disposed normal to, and directly across the complete cross-section of the flowing stream. Particularly in combination with the maintenance of isokinetic flow, it provides for taking a sample which is truly and dependably representative of the entire flow of fluid whereby the test results are dependable and reliable as being indicative of the fluid properties, composition or condition of the entire quantity of fluid that has been subjected to sampling and testitng. The invention is effective and positive acting for its purpose but still has the quality of simplicity.

The foregoing disclosure is representative of preferred forms of the invention and is to be interpreted in an illustrative rather than a limiting sense, the invention to be accorded the full scope of the claim appended hereto.

What is claimed is:

A flow sampling device for isokinetically taking off a representative sample of a flowing stream of fluid for testing thereof comprising a conduit for conducting said flowing stream, means arranged to define a reltaively narrow slot-like opening extending transversely completely across said conduit whereby to take off a representative sample of the stream of fluid, said means defining said slot-like opening comprising a pair of spaced parallel flat plates extending through opposite sides of said conduit and in planes longitudinal to said conduit, arcuate means between said plates arranged to direct all of the fluid entering said slot laterally outwardly of said conduit through one of said opposite sides thereof, means responsive to a condition of the fluid that has passed through the said slot-like opening, means responsive to a condition of the fluid in said conduit but externally of said slot-like opening and means for controlling a flow rate of the fluid such that the relative flow as sensed by the said condition responsive means may be regulated to maintain conditions of isokinetic flow inside and outside of the slot means within said conduit.

References Cited in the file of this patent

UNITED STATES PATENTS

| | | |
|---|---|---|
| 2,020,529 | Thorsten | Nov. 12, 1935 |
| 2,452,224 | Collett | Oct. 26, 1948 |
| 2,665,409 | Rogers | Jan. 5, 1954 |
| 2,693,114 | Tapp et al. | Nov. 2, 1954 |
| 2,982,131 | Rosinski | May 2, 1961 |
| 2,986,940 | Russell | June 6, 1961 |

FOREIGN PATENTS

| | | |
|---|---|---|
| 351,584 | Great Britain | July 2, 1931 |